Feb. 8, 1944.  A. W. LEMMON  2,341,149
CHAIN AND ATTACHMENT
Filed Oct. 28, 1942  3 Sheets-Sheet 1
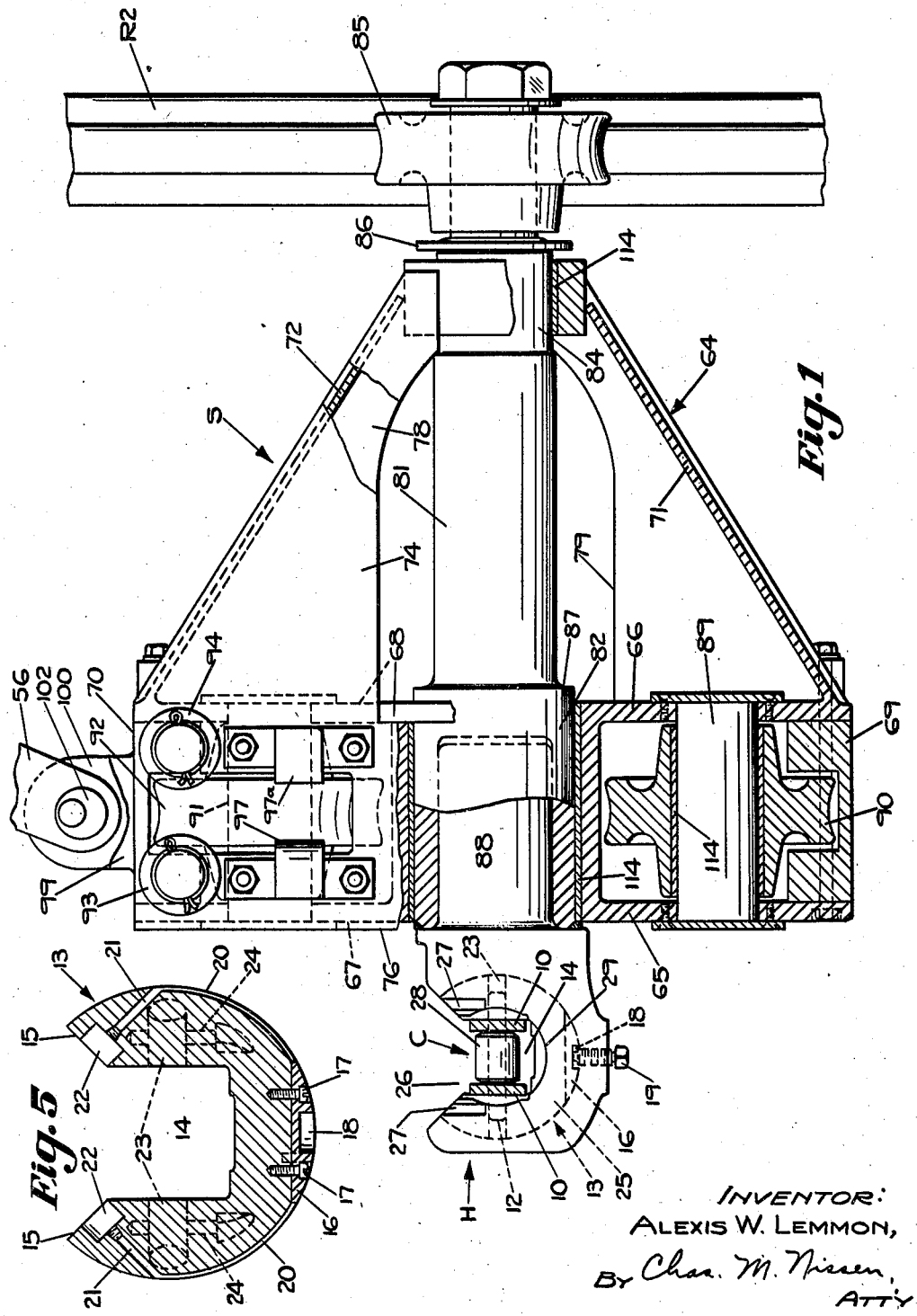
INVENTOR:
ALEXIS W. LEMMON,
By Chas. M. Nissen,
ATT'Y

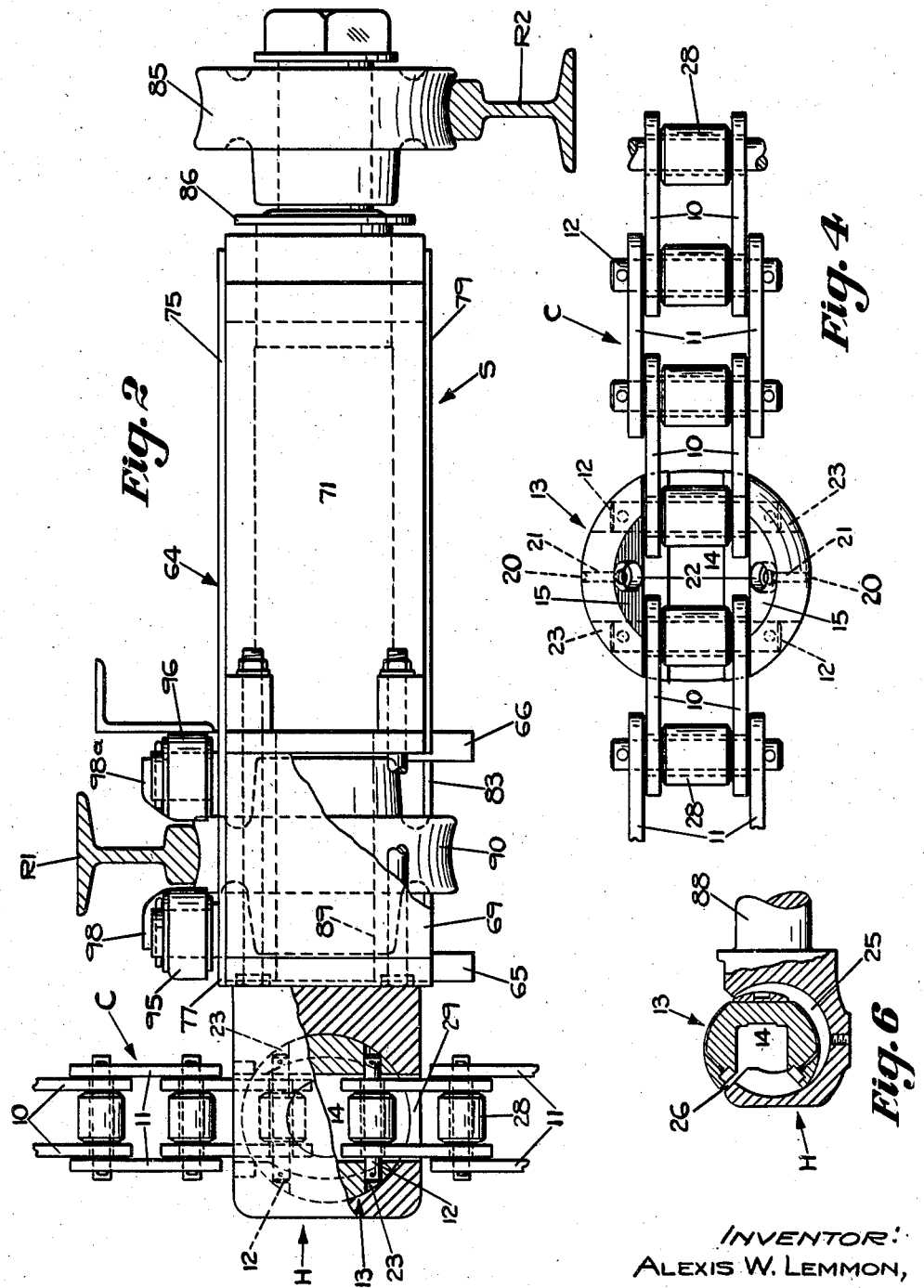

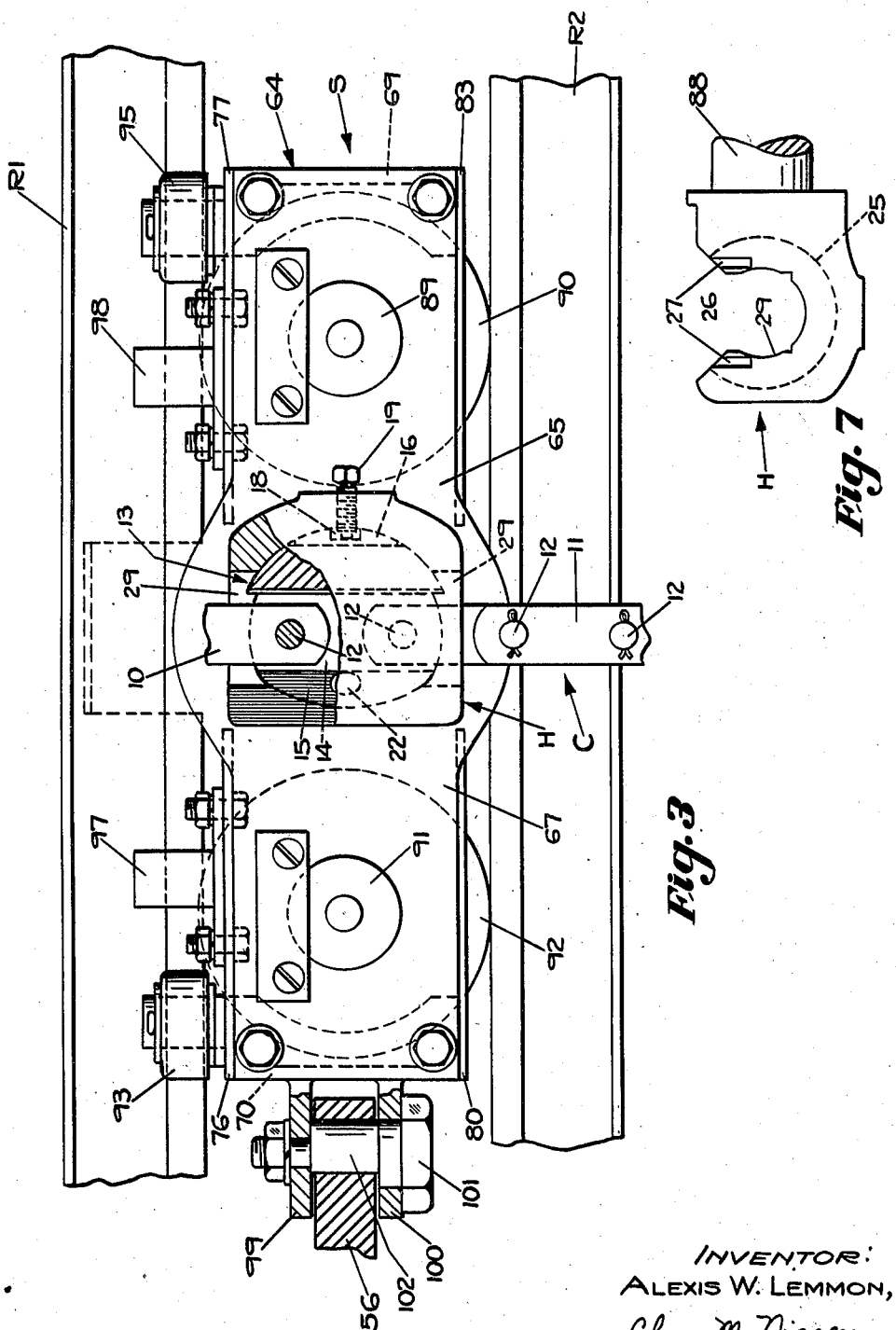

Patented Feb. 8, 1944

2,341,149

UNITED STATES PATENT OFFICE 2,341,149

CHAIN AND ATTACHMENT

Alexis W. Lemmon, Upper Arlington, Ohio, assignor to The Jeffrey Manufacturing Company, a corporation of Ohio Application October 28, 1942, Serial No. 463,629

12 Claims. (Cl. 187—1)

This invention relates to a chain and attachment or hitch by which the chain is connected to an object to be moved, one illustration being a platform elevator.

An object of the invention is to provide an improved and simplified connection between a chain and an object to be moved so that the object may be moved under power with the line of force transmitting from the chain to the moved object being along the normal draft line of the chain, thus eliminating forces tending to twist said chain.

A further object of the invention is to provide a very simple ball and socket connection by which a drive chain is connected to the ball and forces are transmitted from the drive chain to the socket along the normal line of drive of said chain.

A further object of the invention is to provide an attachment for a drive chain which consists of a modified ball forming one link of the chain.

Still another object of the invention is to provide an improved ball and socket connection or hitch which can be readily attached when both the ball and socket are completely assembled, and when attached will be held in proper relative positions.

Still another object of the invention is to provide an improved generally U-shaped chain link with one or more universal bearing surfaces.

Other objects of the invention will appear hereinafter, the novel features and combinations being set forth in the appended claims.

In the accompanying drawings,

Fig. 1 is a plan view with parts cut away showing a shuttle which is attached to the platform or deck of an elevator and is capable of movement parallel with the plane thereof, together with an elevating chain and universal hitch connecting the chain and the shuttle;

Fig. 2 is a side view of the shuttle and chain shown in Fig. 1 with parts broken away;

Fig. 3 is a front view of the shuttle and chain showing also the associated rails connected to the elevator platform;

Fig. 4 is a plan view of a length of the chain showing the ball attachment forming one link thereof;

Fig. 5 is a transverse sectional view of the ball chain link or part of the attachment or hitch;

Fig. 6 is a sectional view of the hitch or ball and socket joint showing the method of assembly of the ball and socket; and Fig. 7 is an end view of the socket or hitch.

The invention herein disclosed is designed particularly for use in connection with the elevator disclosed in complete detail in the application of Charles E. Ellis, Serial No. 457,690, filed September 9, 1942, entitled "Elevator" but it is to be understood that this application is not necessarily limited to this device or even to elevators generally.

In the instant application only a single chain and shuttle car of the elevator is illustrated in detail together with the hitch or connection by which they are interconnected.

Referring particularly to Figs. 1, 2 and 3 of the drawings and to the structure of the shuttle, the shuttle S has a frame designated as a whole by 64, which is of bolted and welded construction. This frame includes vertical wall or web portions 65, 66, 67, 68, 69, 70, 71 and 72; upper horizontal web or body portions 74, 75, 76 and 77; and lower horizontal web or body portions 78, 79, 80 and 83.

A shaft 81 is journaled in the frame, with bearings at 82 and 84. One end of the shaft is provided with a roller 85 which rolls on a rail $R_2$ carried by the elevator platform. Spaced slightly from roller 85 is a washer 86 which is welded to shaft 81 and which limits end play of the shaft. The opposite end of the shaft is enlarged at 87 and recessed to receive stem 88 of chain hitch or socket H. In assembly, the recessed enlargement 87 may be shrunk on stem 88 and then the hitch or socket may be welded to shaft portion 87.

Supported by and spanning the space between vertical frame portions 65 and 66 is an axle 89 on which rotates a roller 90. Supported by and spanning the space between vertical frame portions 67 and 68 is an axle 91 on which rotates a roller 92. Rollers 90 and 92 are beneath, and bear against upper rail $R_1$ also carried by the elevator platform, as shown in Figs. 2 and 3. Four stub axles project upwardly from the shuttle frame and carry rollers 93, 94, 95 and 96, which are adapted to roll on the sides of the head of rail $R_1$ and thereby keep the shuttle on the track. The shuttle is also provided with pairs of horns 97, 97a, and 98, 98a. The head of rail $R_1$ is received between the horns of these pairs of horns, as best seen in Fig. 2.

The appropriate end of the shuttle frame is provided with ears 99 and 100 to which is secured connecting rod 56 that operates the shuttle S along tracks $R_1$ and $R_2$. The attachment of rod 56 to the shuttle is by a bolt 101 having an eccentric portion 102 which passes through rod 56. By turning this bolt to different angular positions, the effective length of rod 56 may be adjusted.

Referring now particularly to the structure of the elevating chain and the mechanism for connecting it to the shuttle S, it may be pointed out that the structure provided is designed to equalize the load on all sides of the draft element or chain to the end that there will be no twisting of said chain but the load or force transmitted to it will be along its normal longitudinal axis, thus obtaining maximum strength of the chain or draft means.

Said chain C is formed of interconnected links comprising generally alternating inner side bars 10 and outside bars 11 interconnected by chain pivot pins 12 preferably provided at opposite ends with removable cotter pins extending through transverse bore holes. As best seen by reference to Fig. 4 of the drawings there is provided a special chain link or attachment 13 which is generally in the shape of a sphere or ball and as best seen by reference to Fig. 5 of the drawings may be considered as a U-shaped chain link having spherical bearing surfaces to transmit force to the socket H in which it fits as hereinafter described more completely.

Said ball or spherical member 13 has a longitudinally extending groove 14 which opens at one side of the ball 13 and adjacent to which opening the side walls of the groove taper in planes which intersect substantially the center of the ball forming tapered surfaces 15 which are provided primarily to aid in the assembly and disassembly of the ball 13 relative to the socket H.

On the opposite side of the ball 13 from that where groove 14 is provided, said ball is provided with a removable portion 16 (see Fig. 5) which is preferably attached to the main body of the ball 13 as by machine screws 17. The removable portion 16 is provided primarily to provide a flat surface on the main body of the ball 13 so that it can be readily held in a machine for machining the various parts thereof. If desired, the removable portion 16 may be made integral with the rest of the ball. Said removable portion 16 is preferably provided with a recess 18 which receives the projecting portion of a set screw 19 to prevent unauthorized displacement of the ball 13 from its socket H while at the same time permitting relative movement between the ball 13 and its receiving socket H sufficient to equalize the forces on the opposite side of the chain, as above described.

As also clearly illustrated in Fig. 5 of the drawings, the body of the ball 13 is provided with grease grooves 20 leading to threaded grease bores 21 adapted to receive grease fittings, not shown, within recesses 22 formed in said ball or link 13.

By reference particularly to Fig. 4 of the drawings, it will be seen that the ball 13 acts as a link of the chain and takes the position which would normally be occupied by a link formed by a pair of outer side bars 11 since links formed by opposite pairs of inner side bars 10 project into the groove 14 and are pivotally attached to the ball or attachment 13 by a pair of pivot pins 12 which extend through the spaced bores 23 formed in said ball 13. Viewed in a slightly different manner, it is evident that the ball 13 is a U-shaped link of the chain C in which there are spherical segments forming universal bearing surfaces on opposite ends. For example, if there is a force applied to the chain in an upward direction as viewed in Fig. 2 of the drawings, the upper half of the ball 13 will cooperate with the upper half of the socket H along their contacting bearing surfaces to transmit the lift force of the chain C to the platform by way of the shuttle S. It is also obvious that a force may be transmitted by the chain C in the opposite direction, in which case the lower half of the ball as viewed in Fig. 2 will cooperate with the lower half of the socket H through their cooperating universal bearing surfaces to transmit the force to the shuttle S. Obviously the forces may be transmitted in opposite directions in a horizontal as well as a vertical plane, or any inclined plane between the horizontal and vertical, and it is obvious that the ball 13, being free to move a limited extent in the socket H, will equalize any forces on the chain C so as to prevent twisting or bending thereof to either side or forwardly or rearwardly, thus providing a maximum efficiency of operation of the chain since the load at all times will be equally distributed between the side bars on the opposite sides thereof.

Referring again to Fig. 5 of the drawings, it may be pointed out that the ball or attachment 13 is provided with bores 24 which communicate and are at right angles to the pin receiving bores 23 and said bores 24 are adapted to receive holding pins by a driving fit, which pins extend through or cooperate with the pivot pins 12 received in the bores 23 of the ball 13 to hold said pins 12 in place.

The structure of the socket H is clearly seen by reference to Figs. 1, 2, 6 and 7 of the drawings. Said socket H has a central cavity 25 which is of generally spherical shape so as normally to receive the ball 13 and providing therewith the opposite universal bearing surfaces above mentioned. In addition said socket H is open at one side and, as clearly illustrated in Fig. 1 of the drawings, this opening forms a substantially continuous side opening 26 with that provided in the ball 13, which was previously described, when the two are in their normal assembled relation. The opening 26 provides for the ready insertion of the ball 13, as clearly illustrated in Fig. 6 of the drawings, and after the ball and socket are in the position illustrated in said Fig. 6, the ball is rotated about its longitudinal axis which is considered the axis of the groove 14 until the opening in the ball 13 and opening 26 in the socket H are in alignment as illustrated in Fig. 1, after which the set screw 19 is inserted.

To provide ample clearance between the side bars 11 adjacent the socket H, portions 27 (see Fig. 7) are milled off since the chain C in operation will travel over a sprocket. It may be further pointed out that the chain C is shown as provided with anti-friction rollers or spools 28, which are preferably made of hardened steel and cooperate with the sprocket teeth which drive the chain.

By reference particularly to Fig. 7 of the drawings it will be seen that opposite sides of the socket H leading to the central cavity 25 are provided with generally cylindrical grooves 29 (see also Figs. 2 and 3) through which grooves 29 the side bars 10 of the chain C extend into the interior of cavity 25 and into the groove 14 of the ball 13. The grooves 29 are, of course, in direct communication with the opening 26 at one side of the socket H.

To assemble the chain and associated apparatus, the chain is first formed at least with a few links as illustrated in Fig. 4 of the drawings. After this the ball or link 13 is inserted into the socket H as illustrated in Fig. 6 of the drawings, only the ball 13 of the chain being here illustrated in the interest of clarity. After the ball 13 is inserted into the socket H, as illustrated in Fig. 6, the chain is rotated until the parts are in the position best illustrated in Fig. 1 of the drawings, in which case the set screw 19 is inserted with its end projecting into the recess 18 for holding the ball and socket joint together. As a matter of fact, the cooperating set screw 19 and recess 18, it will be noted, carry no normal load whatever and they merely prevent relative rotation beyond the desired limited amount between the ball 13 and its receiving socket H because it is impossible to remove the ball 13 from the socket H until after appreciable rotating movement between the two is provided so that they are substantially in the position as illustrated in Fig. 6 of the drawings. In this connection it is to be noted that the socket H is a one piece socket and the ball 13 is essentially a one piece ball and in fact may be made a one piece ball by forming the piece 16 integrally with the rest of the ball, as above described, thus making for a very simple and strong ball and socket connection and one in which forces may be transmitted between the ball 13 and the socket H along lines at opposite directions if reverse draft forces are applied to the chain C. In other words, the ball and socket connection is just as efficient and just as strong when forces are transmitted in one direction as in the other and in each instance there is a universal bearing surface between the ball 13 and the socket H equaling the forces on the two sides of the chain C and preventing the transmittal of any bending or twisting forces to said chain C.

The shuttle S is constructed with suitable bearings, grease passages, grease fittings, etc. The various bearings for rollers, shaft, etc., are preferably provided with bushings of bearing material, such as bushings 114 (three shown) in Fig. 1. To avoid confusion, grease passages, grease grooves, and grease fittings have been eliminated from the drawings.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. A draft chain including links and a ball having bearing surfaces for cooperating with a receiving socket to transmit a load thereto, said ball forming a link of said chain, and a pair of spaced pivot pins extending through said ball and pivotally connecting it as a link of said chain.

2. A draft chain including links and a ball having bearing surfaces for cooperating with a receiving socket to transmit a load thereto, said ball forming a link of said chain and having spaced chain pivot pin receiving holes therein, and spaced pivot pins connecting spaced points of said ball to cooperating links of said chain.

3. As an article of manufacture, a chain link formed as a generally spherical member having outer bearing surfaces and a central slot extending therethrough opening on one side of said spherical member, and two pairs of spaced aligned chain pin receiving holes.

4. A chain comprising spaced side bars interconnected by chain pins, an attachment link in said chain formed generally spherical with outer bearing surfaces and a slot extending therethrough and opening on one side thereof, chain side bars extending into opposite ends of said slot, and chain pins interconnecting said side bars and said attachment link.

5. A chain comprising spaced side bars interconnected by chain pins, an attachment link in said chain formed generally spherical with outer bearing surfaces and a slot extending therethrough, chain side bars extending into opposite ends of said slot, and chain pins interconnecting said side bars and said attachment link.

6. A power transferring attachment including a socket having a generally spherical interior bearing surface with universal bearing surfaces on opposite ends and open at one side, a generally spherical bearing member open at one side and adapted for insertion into the open side of said socket, said bearing member when inserted having its open side adjacent the open side of said socket and providing universal bearing therewith on opposite sides, and draft chain means connected with said generally spherical member capable of applying forces thereto selectively in opposite directions which may be transmitted by said member to said socket over universal bearing surfaces which equalize the load on all sides of said draft means.

7. An article of manufacture comprising a chain link formed of generally U-shape with universal bearing surfaces on opposite sides thereof and pairs of spaced pivot pin receiving bores adjacent opposite ends thereof.

8. An article of manufacture comprising a chain link formed of generally U-shape with universal bearing surfaces on at least one side thereof and pairs of spaced pivot pin receiving bores adjacent opposite ends thereof.

9. A universal chain and socket coupling including a one piece socket having universal bearing surfaces for opposed lines of draft and a side opening, and a generally spherical draft transmitting chain link having cooperating bearing surfaces for opposite lines of draft and also a side opening, said chain link and socket being engageable and disengageable by virtue of said side openings upon their relative rotation while each is completely assembled, and cooperating chain links pivotally attached to the aforementioned chain link.

10. A universal chain and socket coupling including a socket having universal bearing surfaces for opposed lines of draft and a side opening, and a generally spherical draft transmitting chain link having cooperating bearing surfaces for opposite lines of draft and also a central slot with a side opening, said chain link and socket being engageable and disengageable by virtue of said side openings upon their relative rotation while each is completely assembled, and cooperating chain links extending into opposite ends of said central slot and pivotally attached to said spherical chain link.

11. A universal chain and socket coupling including a one piece socket having universal bearing surfaces for opposed lines of draft and a side opening, and a generally spherical draft transmitting chain link having cooperating bearing surfaces for opposite lines of draft and also a side opening, said chain link and socket being engageable and disengageable by virtue of said side openings upon their relative rotation while each is completely assembled, said socket and spherical chain link being held together by their mutual cooperation when they are positioned with their side openings in substantial alignment, and additional chain links pivotally attached to said spherical chain link.

12. A chain comprising spaced links interconnected by chain pins, an attachment link in said chain formed generally spherical with outer bearing surfaces and a slot extending therethrough, chain links extending into opposite ends of said slot, and chain pins interconnecting said chain links and said attachment link.

ALEXIS W. LEMMON.